UNITED STATES PATENT OFFICE.

RALPH H. McKEE, OF RIDGEFIELD PARK, NEW JERSEY.

FOOD PRODUCT AND PROCESS OF MAKING SAME.

1,251,070.　　　　　Specification of Letters Patent.　　Patented Dec. 25, 1917.

No Drawing.　　　Application filed May 11, 1917.　Serial No. 167,949.

*To all whom it may concern:*

Be it known that I, RALPH H. McKEE, a citizen of the United States, residing at Ridgefield Park, in the county of Bergen and State of New Jersey, have invented certain new and useful Improvements in Food Products and Processes of Making Same, of which the following is a specification.

This invention relates to the production of baked cereal products of the character of bread, rolls, crackers, and the like, and has for its object to provide products of this character wherein a portion of the wheat flour ordinarily used is replaced by another material adapted for human consumption to produce a product of pleasing taste, in which the added ingredient will not neutralize the effect of the gluten in the wheat flour.

A further object of the invention is to provide a product of the character referred to which will be of approximately the same volume for a given weight as similar products made from ordinary wheat flour.

Another object of the invention is to provide bread, rolls, crackers and the like, wherein the starch content is not materially less than that of similar products made from ordinary wheat flour.

Another object of the invention is to provide a cereal product which can be produced without the addition of shortening, fats or oils.

Another object is to provide bread, rolls, crackers and the like which can be produced at less cost than corresponding baked cereal products made of ordinary wheat flour and which can be eaten regularly for long periods by those accustomed to the use of ordinary wheat products without any deleterious effect upon the digestive organs and without the users gradually acquiring a distaste for the product, which disadvantages are inherent in materials resulting from prior attempts to lower the cost of bakery products by substituting some other material for a portion of the wheat flour used therein.

I have discovered that if finely ground peanut cake resulting from expressing the oil from peanuts without the hulls and containing not to exceed approximately 12% of oil, be added to wheat flour in the preferred proportions of approximately from ten to twenty parts to 100 parts by weight of wheat flour there is produced a mixture from which a baked cereal product having the properties which as hereinbefore set forth, it is the object of my invention to provide, can be satisfactorily produced.

In the practice of my invention I mix finely ground peanut cake produced from peanut meats, without the shells and preferably without the skins, and containing approximately from 7 to 12% of oil, with wheat flour in the preferred proportions of one part of the ground peanut cake to five parts by weight of the flour. To this I add water and seasoning, such as salt, sugar or the like, form the resulting dough into loaves or other desired shapes and bake. No shortening need be added.

The baking is carried out in the same manner in which ordinary wheat flour bakery products are baked. The material browns in the oven even more readily than ordinary types of wheat flour products and acquires a rich light or dark brown tint according to oven conditions as will be understood by housewives and bakers.

I may use either ground, raw or cooked peanut cake. If the latter is employed the cake may be boiled or roasted to any desired extent according to the taste demands of the baker either before or after expressing the oil from the peanuts.

The use of the ground peanut cake having not to exceed approximately 12% of oil does not result in neutralizing the effects of the gluten in the wheat flour as is the case with meal or flour from maize and other cereal heretofore used and the starch content of the final product is not materially lessened as in the case of the use of true nuts with the wheat flour.

Bakery products produced in accordance with my process have an agreeable taste of which users do not tire, so that my product may be used indefinitely and the digestion of users is not in any way impaired by its use.

While I have described in detail the preferred practice of my process it is to be understood that the details of procedure and proportions of ingredients may be widely varied without departing from the spirit of my invention or the scope of the subjoined claims.

Having thus described my invention, I claim:

1. The herein described process of producing food products which consists in adding to wheat flour ground peanut cake containing not to exceed approximately 12% of oil, adding water, kneading the mixture and baking the same.

2. The herein described process of producing food products which consists in adding to wheat flour ground peanut cake containing not to exceed approximately 12% of oil in the proportions of one part of the ground peanut cake to five parts of wheat flour, adding water, kneading the mixture and baking the same.

3. A food product comprising a baked mixture of wheat flour and ground peanut cake containing not to exceed approximately 12% of oil.

4. A food product comprising a baked mixture of wheat flour and ground peanut cake containing not to exceed approximately 12% of oil in the approximate proportions of one part of the ground peanut cake to five parts of wheat flour.

In testimony whereof I affix my signature in presence of two witnesses.

RALPH H. McKEE.

Witnesses:
HELEN MILLER NOYES,
ROBERT J. BARNETT.

Copies of this patent may be obtained for five cents each, by addressing the "Commissioner of Patents, Washington, D. C."